United States Patent
In et al.

(10) Patent No.: US 12,284,296 B2
(45) Date of Patent: Apr. 22, 2025

(54) METHOD OF MANAGING DATA HISTORY AND DEVICE PERFORMING THE SAME

(71) Applicant: ELECTRONICS AND TELECOMMUNICATIONS RESEARCH INSTITUTE, Daejeon (KR)

(72) Inventors: Min Kyo In, Daejeon (KR); Won Suk Lee, Daejeon (KR); Suwook Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 222 days.

(21) Appl. No.: 18/063,926

(22) Filed: Dec. 9, 2022

(65) Prior Publication Data

US 2023/0269104 A1   Aug. 24, 2023

(30) Foreign Application Priority Data

Feb. 18, 2022   (KR) .......................... 10-2022-0021533

(51) Int. Cl.
*H04L 9/00*   (2022.01)
(52) U.S. Cl.
CPC ...................... *H04L 9/50* (2022.05)
(58) Field of Classification Search
CPC ....... H04L 9/50; H04L 9/3239; H04L 67/104; H04L 9/3236; H04L 63/123; G06F 21/64; G06F 21/645
See application file for complete search history.

(56) References Cited

U.S. PATENT DOCUMENTS

| | | | |
|---|---|---|---|
| 11,308,448 B1* | 4/2022 | Knas | G06Q 10/105 |
| 2020/0285634 A1 | 9/2020 | Jho | |
| 2021/0044428 A1 | 2/2021 | Hwang | |
| 2021/0201310 A1* | 7/2021 | Moss-Pultz | G06F 21/64 |
| 2022/0101261 A1* | 3/2022 | Wiacek | G08G 5/0039 |
| 2022/0253546 A1* | 8/2022 | Antonopoulos | H04L 9/50 |

FOREIGN PATENT DOCUMENTS

| | | | |
|---|---|---|---|
| KR | 10-2019-0130933 A | | 11/2019 |
| KR | 10-2088346 B1 | | 3/2020 |
| KR | 1020200048440 A | * | 5/2020 |

OTHER PUBLICATIONS

Youngjin Jeong et al., "Data history management technology Focusing on electronic documents, history management model, and database technology," KISTI, Oct. 2010.

* cited by examiner

*Primary Examiner* — Henry Tsang

(57) ABSTRACT

Provided is a method of managing a data history and a device performing the method. The method of managing the data history includes generating second data based on first data, calculating a second hash value for the second data based on the second data and a first hash value for the first data, and storing the second hash value on a blockchain network to verify the second data, and a history of the first data is verified using the first hash value stored on the blockchain network.

13 Claims, 5 Drawing Sheets

METHOD OF MANAGING DATA HISTORY AND DEVICE PERFORMING THE SAME

CROSS-REFERENCE TO RELATED APPLICATIONS

This application claims the benefit of Korean Patent Application No. 10-2022-0021533 filed on Feb. 18, 2022, in the Korean Intellectual Property Office, the entire disclosure of which is incorporated herein by reference for all purposes.

BACKGROUND

1. Field of the Invention

One or more example embodiments relate to a method of managing data history and a device performing the method.

2. Description of Related Art

In the task of analyzing data and developing an artificial intelligence model based on data, data is the most important factor in determining the reliability of the results. Data may be manipulated and deformed during the analysis process, and incorrect manipulation and deformation of data may produce distorted results. Therefore, when using or reusing data, it is necessary to check whether the data is manipulated or deformed.

The source of the data refers to all information related to the generation of the data, such as a time of generation of information, the generator, and the changer, and the data change history, including all information passed on by the data that was processed according to the user purpose from the initial data generation that may provide transparency about the past path of the data to ensure the reliability of the data and analysis results.

The above description is information the inventor(s) acquired during the course of conceiving the present disclosure, or already possessed at the time, and is not necessarily art publicly known before the present application was filed.

SUMMARY

Data goes through countless data transformation processes in the process of being used and destroyed after an initial generation. When the data goes through a plurality of processes and a source and a change history are lost, a fatal error may occur in maintaining the reliability of the data. However, since the data user may know the information about the data to be used (e.g., the source of data and the data change history) only from the information provided by the data provider, there is no way for the user to verify it even when the data provider provides false data. Accordingly, a technology for reliably transmitting the information of the data regardless of the reliability of the data provider may be required.

Various example embodiments may provide technology for reliably transmitting the information about the data based on a hash value of the data, regardless of the reliability of a provider of the data.

However, the technical aspects are not limited to the aspects above, and there may be other technical aspects.

Additional aspects of example embodiments will be set forth in part in the description which follows and, in part, will be apparent from the description, or may be learned by practice of the disclosure.

According to example embodiments, a method of managing a data history includes generating second data based on first data, calculating a second hash value for the second data based on the second data and a first hash value for the first data, and storing the second hash value on a blockchain network to verify the second data, and a history of the first data is verified using the first hash value stored on the blockchain network.

The first data may include data generated from one or more data.

The first data may include raw data obtained from one or more data sources.

The first hash value may be obtained by inputting two or more of the first data, a hash value for data used to generate the first data, a data processing function used to generate the first data, and information about the first data into a hash function.

When the first data is raw data obtained from a data source, the first hash value may be obtained by inputting the first data and information about the first data into the hash function and when the first data is not the raw data, the first hash value may be obtained by inputting the first data, a hash value for data used to generate the first data, a data processing function used to generate the first data, and information about the first data into the hash function.

The calculating may include calculating the second hash value by inputting the first hash value, a data processing function, the second data, and information about the second data into a hash function, and the data processing function may be used to generate the second data from the first data.

A history of the second data may be verified by determining whether a hash value generated based on the second data by the second user and the second hash value are the same.

According to example embodiments, a device for managing a data history includes a memory configured to store instructions, and a processor electrically connected to the memory and configured to execute the instructions, and when the instructions are executed by the processor, the processor may be configured to generate second data based on first data, calculate a second hash value for the second data based on the second data and a first hash value for the first data, and store the second hash value on a blockchain network to verify the second data, and a history of the first data may be verified using the first hash value stored on the blockchain network.

The first data may include data generated from one or more data.

The first data may include raw data obtained from one or more data sources.

The first hash value may be obtained by inputting two or more of the first data, a hash value for data used to generate the first data, a data processing function used to generate the first data, and information about the first data into a hash function.

When the first data is raw data obtained from a data source, the first hash value may be obtained by inputting the first data and information about the first data into the hash function and when the first data is not the raw data, the first hash value may be obtained by inputting the first data, a hash value for data used to generate the first data, a data processing function used to generate the first data, and information about the first data into the hash function.

The processor may be configured to calculate the second hash value by inputting the first hash value, a data processing function, the second data, and information about the second data into a hash function, and the data processing function may be used to generate the second data from the first data.

A history of the second data may be verified by determining whether a hash value generated based on the second data by the second user and the second hash value are the same.

According to example embodiments, a system of managing a data history includes a blockchain network and a device configured to manage a data history, and the device may be configured to generate second data based on first data, calculate a second hash value for the second data based on the second data and a first hash value for the first data, and store the second hash value on a blockchain network to verify the second data, and a history of the first data may be verified using the first hash value stored on the blockchain network.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
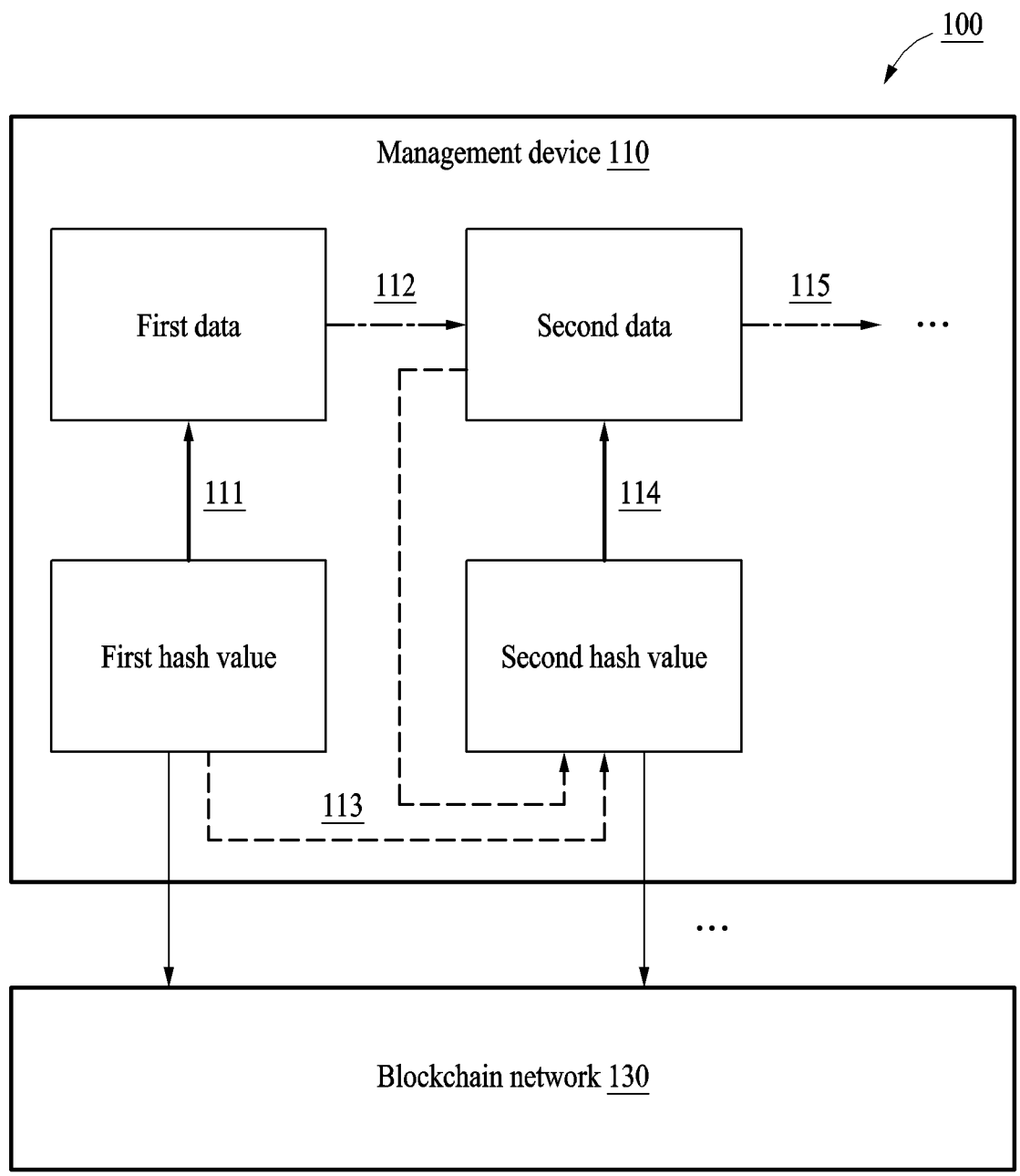
FIG. 1 is a schematic diagram illustrating a system of managing a data history according to various example embodiments.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like elements and a repeated description related thereto will be omitted.

FIG. 1 is a schematic diagram illustrating a system of managing a data history according to various example embodiments.

Referring to FIG. 1, according to various example embodiments, a data history management system 10 may include a management device 110 and a blockchain network 130. The data history management system 10 may guarantee the reliability of data by managing the data history using the management device 110 and the blockchain network 130. The data history management system 10 may guarantee the reliability of data by calculating a hash value for the data history through the management device 110 and storing the hash value on the blockchain network 130.

According to various example embodiments, the data history may include each data and information about the data in all processes in which data is generated and used. The information about data may include information about a data user, information about a data source, extraction information of data, a function for the data pre-processing (e.g., data classification, data transformation, data cleansing, etc.), storage location information of data, metadata information of data (e.g., data date, data length, etc.), and a block address of the blockchain where a hash value about data is stored.

Operations 111 to 115 may describe an operation in which the management device 110 manages the data history to guarantee the reliability of data. Operations 111 to 115 may be sequentially performed.

In operation 111, the management device 110 may manage (e.g., verify) a history of first data corresponding to a first hash value by using the first hash value stored on the blockchain network 130. A first user may obtain the first hash value based on the block address on the blockchain network 130 in which the first hash value is stored among information about the first data received from a previous user of the first user. The history of the first data may be verified by determining whether the hash value generated based on the first data by the first user of the management device 110 performing operations 111 to 114 and the first hash value stored on the blockchain network 130 are the same. The first data may be raw data obtained from one or more data sources or data generated from one or more data sources. The first hash value may be obtained (e.g., calculated) by inputting two or more of the first data, the hash value for the data used to generate the first data, the data processing function used to generate the first data, and the information about the first data into the hash function (e.g., SHA0, SHA1, SHA256/224, etc.) by the previous user of the first user of the management device 110 performing operations 111 to 114, and then stored on the blockchain network 130. For example, when the first data is raw data obtained from a data source, the first hash value may be obtained by inputting the first data and information about the first data into the hash function and when the first data is not raw data, the first hash value may be obtained by inputting the first data, a hash value for the data used to generate the first data, a data processing function used to generate the first data, and information about the first data into the hash function.

In operation 112, the management device 110 may generate the second data based on the first data. For example, the second data may be an integration of first data including one or more data, an extraction of a portion of the first data, or a deformation of the first data. The management device 110 may use a data processing function corresponding to an operation of generating the second data from the first data.

In operation 113, the management device 110 may calculate a second hash value for the second data based on the second data and the first hash value for the first data. For example, the management device 110 may calculate the second hash value by inputting the second data, the first hash value, the data processing function used to generate the second data from the first data, and information about the second data into the hash function.

In operation 114, the management device 110 may store the second hash value on the blockchain network 130. A second user different from the first user of the management device 110 performing operations 111 to 114 may manage (e.g., verify) a history of the second data based on the second hash value before generating new data using the second data. The second user may obtain the second hash value based on the block address on the blockchain network 130 in which the second hash value is stored among the information about the second data received from the first user. The history of the second data may be verified by determining whether the hash value generated based on the second data by the second user and the second hash value stored on the blockchain network 130 are the same.

Figure 2:
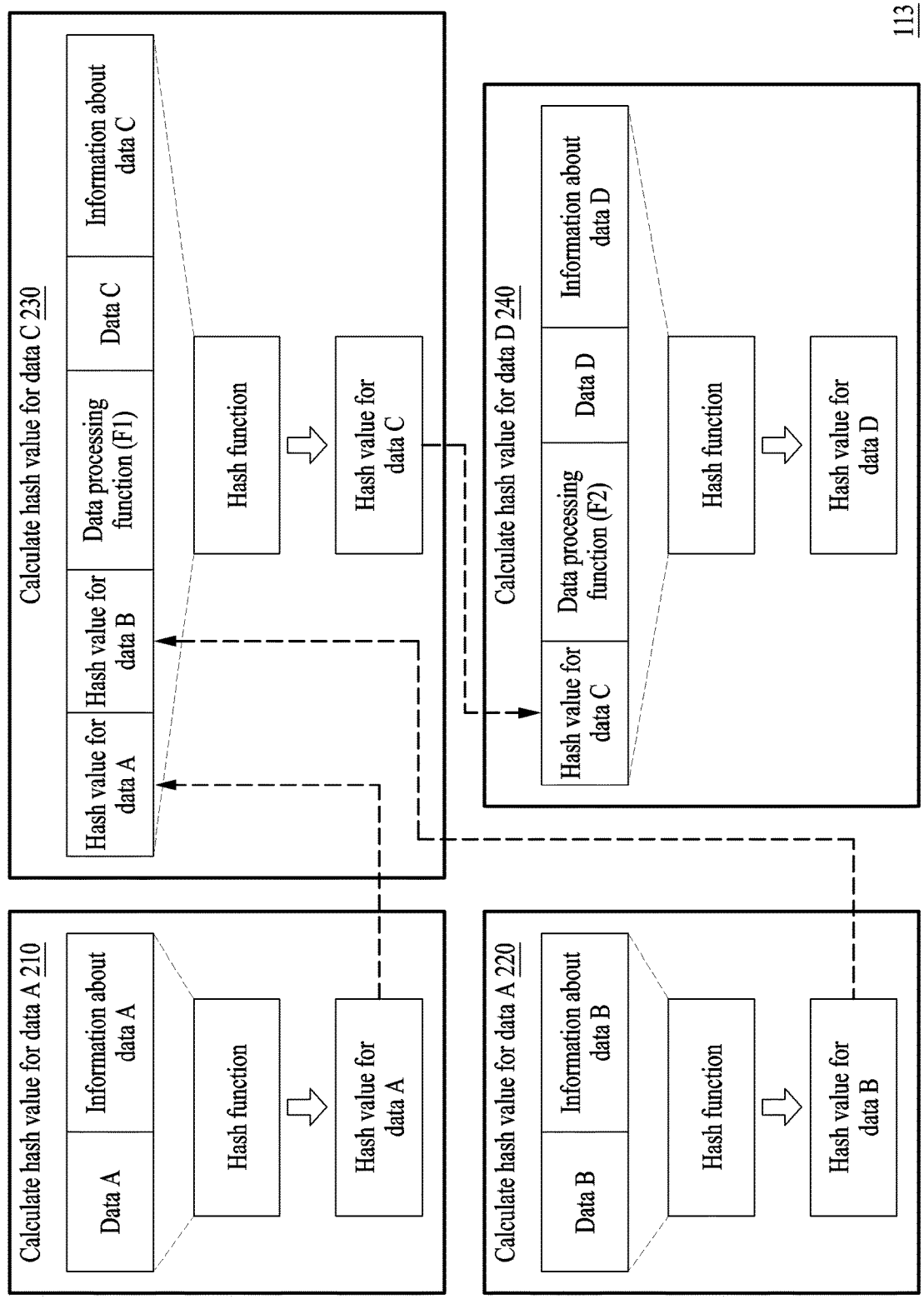
FIG. 2 is a diagram illustrating an example of an operation of calculating a hash value by a management device according to various example embodiments.

FIG. 2 is a diagram illustrating an example of an operation of calculating a hash value by a management device according to various example embodiments.

Referring to FIG. 2, according to various example embodiments, when the first data is raw data (e.g., data A and data B) obtained from two data sources, the management device 110 may generate the second data (e.g., data C) from the first data and generate third data (e.g., data D) from the second data in the same manner as that of generating the second data from the first data. The management device 110 may manage (e.g., verify) the history of the first data to the third data by calculating the hash value for each of the first data to the third data and storing the hash value in the blockchain network (e.g., the blockchain network 130 in FIG. 1), and guarantee the reliability of the first data to the third data. In FIG. 2, the examples illustrate a case in which the management device 110 sequentially generates data C and data D from the raw data (e.g., data A and data B) and includes only four modules 210 to 240 correspondingly, but is not limited thereto, and the management device 110 may sequentially generate (e.g., integrate, deform, or extract) other data from data D and include a number of modules corresponding to the number of data.

According to various example embodiments, a first module 210 may calculate the hash value for data A by inputting data A and information about data A into a predetermined hash function by an initial user (e.g., an owner) of data A. The first module 210 may store the hash value for data A on the blockchain network 130. Data A may be stored in separate storage (e.g., storage, temporary storage, or storage for data distribution of an owner) other than the blockchain and may not be stored on the blockchain.

According to various example embodiments, a second module 220 may calculate a hash value for data B by inputting data B and information about data B into a predetermined hash function by an initial user (e.g., an owner) of data B. The initial user of data B may be the same as or different from the initial user of data A. The second module 220 may store the hash value for data B on the blockchain network 130. Data B may be stored in separate storage (e.g., storage, temporary storage, or storage for data distribution of an owner) other than the blockchain and may not be stored on the blockchain.

According to various example embodiments, a third module 230 may verify data A and data B by the first user different from the initial user of data A and data B. The first user may obtain the hash value for each of data A and data B based on the block address on the blockchain network 130 in which the hash value for each of data A and data B is stored among information about data A and data B received from the initial user of data A and data B. The third module 230 may manage (e.g., verify) the history of data A and data B by determining whether the hash value generated based on data A and data B by the first user and the hash value for each of data A and data B stored on the blockchain network 130 are the same.

According to various example embodiments, the third module 230 may generate (e.g., integrate) data C by inputting data A and data B into the first data processing function. The third module 230 may calculate the hash value for data C by inputting the hash value for data A, the hash value for data B, the first data processing function, data C, and information about data C into a predetermined hash function. The third module 230 may store the hash value for data C on the blockchain network 130. Data C may be stored in separate storage (e.g., storage, temporary storage, or storage for data distribution of an owner) other than the blockchain and may not be stored on the blockchain.

According to various example embodiments, a fourth module 240 may verify data C by the second user different from the first user. The fourth module 240 may verify data C by determining whether the hash value generated based on data C by the second user and the hash value for data C stored in the blockchain network 130 are the same. The second user may obtain the hash value for data C based on the block address on the blockchain network 130 in which the hash value for each of data C is stored among information about data C received from the first user.

According to various example embodiments, the fourth module 240 may generate (e.g., deform) data D by inputting data C into a second data processing function. The fourth module 240 may calculate the hash value for data D by inputting the hash value for data C, the second data processing function, data D, and information about data D into a predetermined hash function. The fourth module 240 may store the hash value for data D on the blockchain network 130. Data D may be stored in separate storage (e.g., storage, temporary storage, or storage for data distribution of an owner) other than the blockchain and may not be stored on the blockchain.

According to various example embodiments, the management device 110 may form a chain connection relationship between hash values for data by including the hash value calculated by each module 210 to 240 as one of the input values for calculating the hash value of the next module. The management device 110 may provide a device that may immediately determine whether data is distorted based on the chain connection relationship between the hash values for the data, manage the data and the data history, and guarantee the reliability of the data and the data history.

According to various example embodiments, since the management device 110 calculates the hash value for the data based on the information about the data and the information about the data includes information about the initial user (e.g., the owner) of the data, when a legal issue arises due to a data ownership problem, the data history may be analyzed accurately to specify the owner of the data and the owner of the data may be clearly determined by stake.

Figure 3:
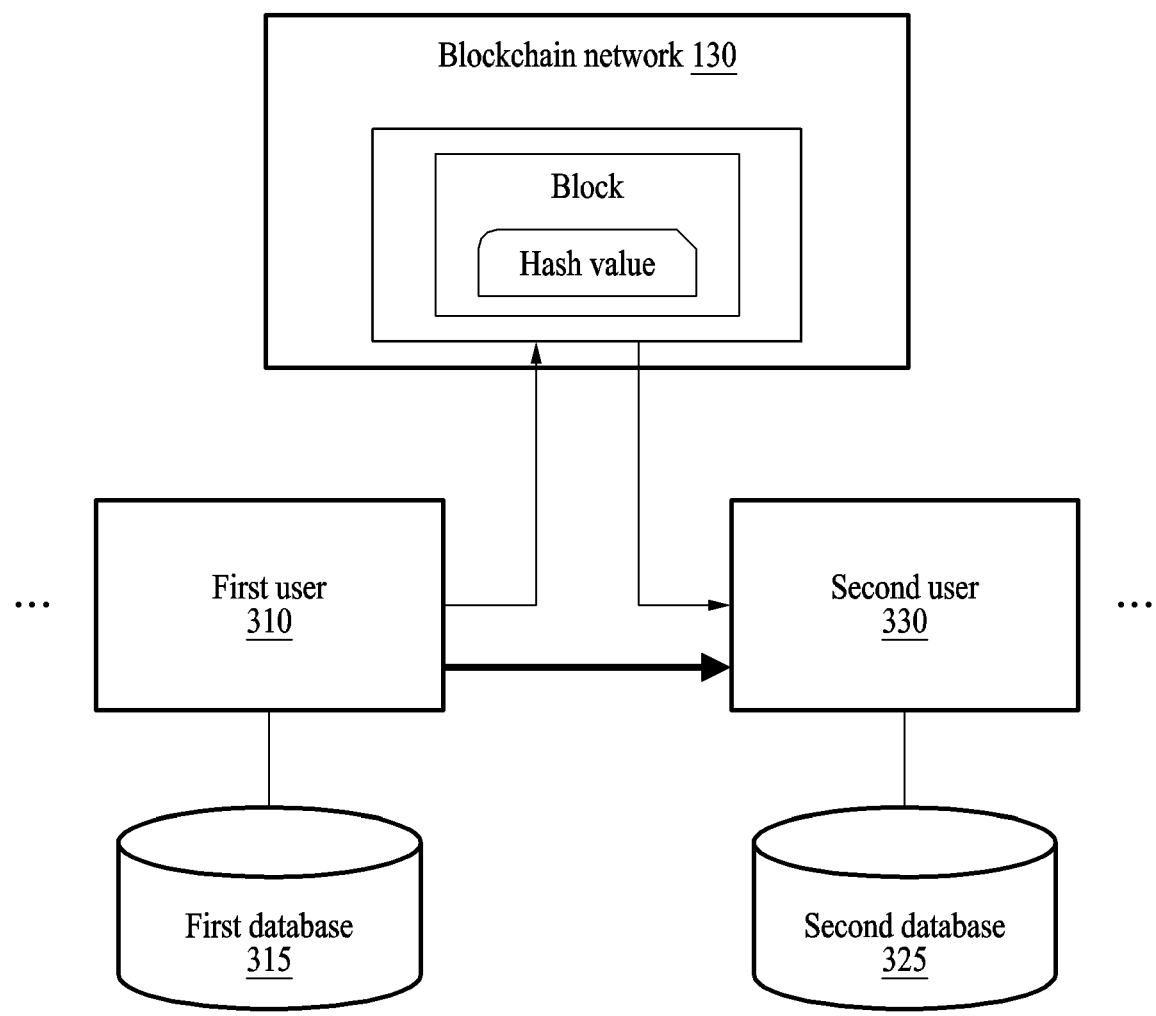
FIG. 3 is a diagram illustrating an operation between a first user and a second user of a management device according to various example embodiments.

FIG. 3 is a diagram illustrating an operation between a first user and a second user of a management device according to various example embodiments.

Referring to FIG. 3, according to various example embodiments, each of the plurality of users of the management device 110 may generate new data using verified data by managing (e.g., verifying) the history of the data received from the previous user. In FIG. 3, a case in which the plurality of users is a total of two as the first user 310 and the second user 320 will be described, but is not limited thereto, and the number of the plurality of users may not be limited.

According to various example embodiments, the management device 110 may perform the pre-processing (e.g., extracting, loading, transforming, etc.) on data received from the previous user to generate new data intended by each of the first user 310 and the second user 320. The management device 110 may include a first database 315 and a second database 325. The management device 110 may store data generated by each of the first user 310 and the second user 320 and the information of the generated data into each of the first database 315 and the second database 325. The information about the data may include information of the data user, information of the data source, information of the data extraction, a function for the data pre-processing (e.g., data classification, data transformation, data cleansing, etc.), information of the data storage location, metadata information of data (e.g., data date, data length, etc.), and block address of the blockchain in which the hash value for the data is stored. According to various example embodiments, the management device 110 may transmit information about the received data from the first user 310 to the second user 320 so that the second user 320 may verify the history of the data received from the first user 310 who is the previous user. The information about the received data may be provided from the first database 315.

According to various example embodiments, the blockchain network 130 may store only the hash value for each data. The data corresponding to the hash value, the blockchain in which the hash value for each data is stored and the block address may be stored in separate storage (e.g., storage, temporary storage, or storage for data distribution of an owner) other than the blockchain.

Figure 4:
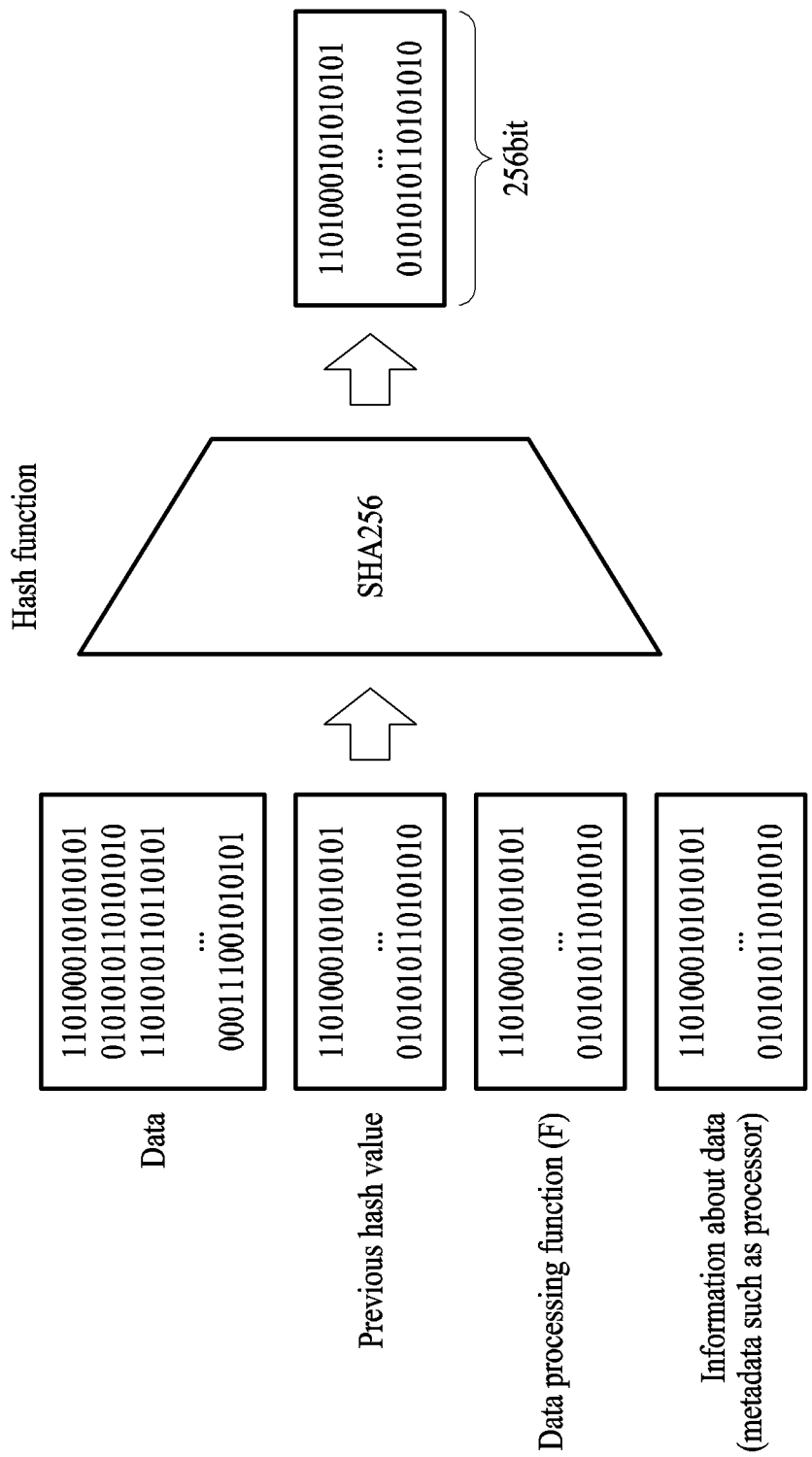
FIG. 4 is a diagram illustrating an example of an operation of calculating a hash value using a hash function by a management device according to various example embodiments.

FIG. 4 is a diagram illustrating an example of an operation of calculating a hash value using a hash function by a management device according to various example embodiments.

Referring to FIG. 4, according to an example embodiment, the management device 110 may calculate the hash value for the data using the SHA256 hash function as a hash function. For example, when the data is raw data obtained from a data source, the management device 110 may obtain the hash value of the data by inputting the data and the information about the data into a hash function. For example, when the data is not the raw data, the management device 110 may obtain the hash value of the data by inputting the data, a hash value for other data used to generate the data, a data processing function used to generate the data, and the information about the data into a hash function.

According to an example embodiment, the management device 110 may calculate a 256-bit hash value by using the SHA256 hash function as the hash function. The management device 110 may calculate a completely different hash value even when the input of the hash function is changed by 1 bit. The user of the management device 110 may obtain an accurate hash value of the data only by inputting other data used to generate the data and other data used to generate the data into a hash function in the correct order.

Figure 5:
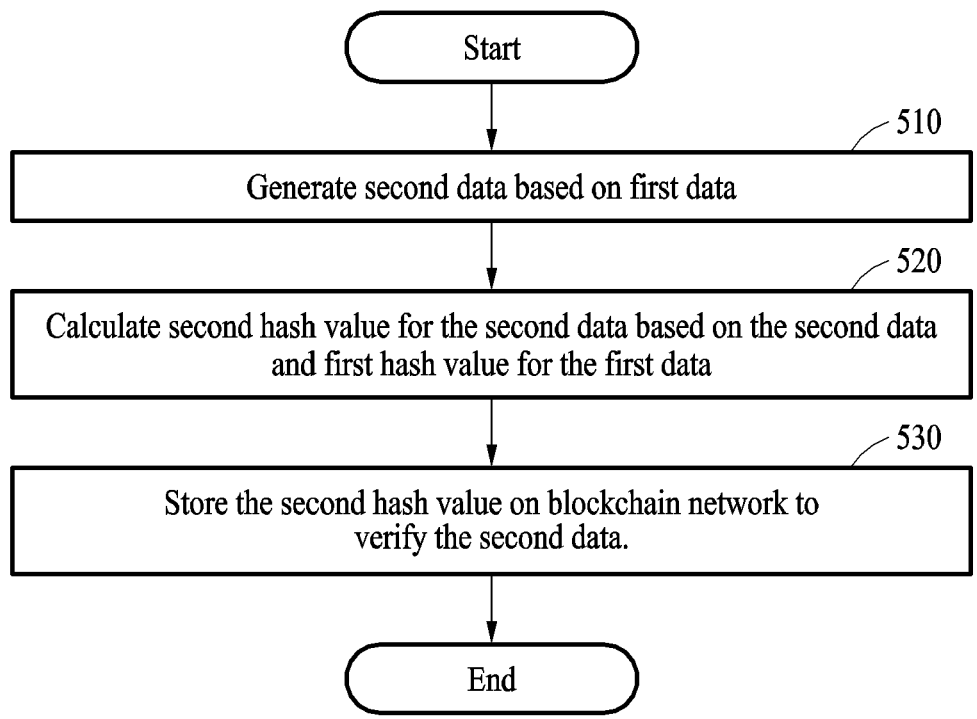
FIG. 5 is a flowchart illustrating an operation of managing a data history by a management device according to various example embodiments.

FIG. 5 is a flowchart illustrating an operation of managing a data history by a management device according to various example embodiments.

Operations 510 to 530 may describe an operation in which the management device 110 manages the data history to guarantee the data reliability. Operations 111 to 115 may be sequentially performed.

In operation 510, the first user of the management device 110 may generate the second data based on the first data. The history of the first data may be verified by using the first hash value stored on the blockchain network (e.g., the blockchain network 130 of FIG. 1).

In operation 520, the first user may calculate the second hash value for the second data based on the second data and the first hash value for the first data.

In operation 530, the first user may store the second hash value on the blockchain network 130 so that the second user different from the first user verifies the second data by using the second hash value.

Figure 6:
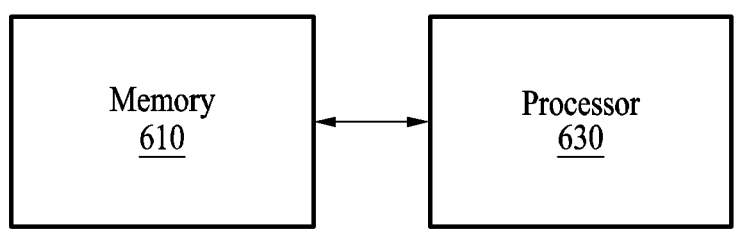
FIG. 6 is a diagram illustrating another example of a management device according to various example embodiments.

FIG. 6 is a diagram illustrating another example of a management device according to various example embodiments.

Referring to FIG. 6, according to various example embodiments, a management device 600 may include a memory 610 and a processor 630.

According to various example embodiments, the memory 610 may store instructions (e.g., a program) executable by the processor 630. For example, the instructions may include instructions for performing an operation of the processor 630 and/or an operation of each component of the processor 630.

According to various example embodiments, the memory 610 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM(CBRAM), ferroelectric RAM (Fe-RAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory.

The processor 630 may execute computer-readable code (e.g., software) stored in the memory 610 and instructions triggered by the processor 630. The processor 630 may be a hardware-implemented data processing device having a circuit that is physically structured to execute desired operations. The desired operations may include code or instructions included in a program. For example, the hardware-implemented data processing device may include a microprocessor, a CPU, a processor core, a multi-core processor, a multiprocessor, an application-specific integrated circuit (ASIC), and a field-programmable gate array (FPGA).

According to various example embodiments, operations performed by the processor 630 may be substantially the same as the operations performed by the management device 110 described with reference to FIGS. 1 to 5. Accordingly, further description thereof is not repeated herein.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The example embodiments described herein may be implemented using a hardware component, a software component and/or a combination thereof. A processing device may be implemented using one or more of general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of managing a data history, the method comprising:
generating second data based on first data;
calculating a second hash value for the second data based on the second data and a first hash value for the first data; and
storing the second hash value on a blockchain network to verify the second data,
wherein a history of the first data is verified using the first hash value stored on the blockchain network,
wherein the calculating comprises:
calculating the second hash value by inputting the first hash value, a data processing function, the second data, and information about the second data into a hash function,
wherein the data processing function is used to generate the second data from the first data.

2. The method of claim 1, wherein the first data comprises data generated from one or more data.

3. The method of claim 1, wherein the first data comprises raw data obtained from one or more data sources.

4. The method of claim 1, wherein the first hash value is obtained by inputting two or more of the first data, a hash value for data used to generate the first data, a data processing function used to generate the first data, and information about the first data into a hash function.

5. The method of claim 4, wherein, when the first data is raw data obtained from a data source, the first hash value is obtained by inputting the first data and the information about the first data into the hash function, and
when the first data is not the raw data, the first hash value is obtained by inputting the first data, the hash value for data used to generate the first data, the data processing function used to generate the first data, and the information about the first data into the hash function.

6. The method of claim 1, wherein a history of the second data is verified by determining whether a hash value generated based on the second data and the second hash value are the same.

7. A device for managing a data history, the device comprising:
a memory configured to store instructions; and
a processor electrically connected to the memory and configured to execute the instructions,
wherein, when the instructions are executed by the processor, the processor is configured to:
generate second data based on first data;
calculate a second hash value for the second data based on the second data and a first hash value for the first data; and
store the second hash value on a blockchain network to verify the second data,
wherein a history of the first data is verified using the first hash value stored on the blockchain network, and
wherein the processor is configured to calculate the second hash value by inputting the first hash value, a data processing function, the second data, and information about the second data into a hash function, the data processing function being used to generate the second data from the first data.

8. The device of claim 7, wherein the first data comprises data generated from one or more data.

9. The device for claim 7, wherein the first data comprises raw data obtained from one or more data sources.

10. The device of claim 7, wherein the first hash value is obtained by inputting two or more of the first data, a hash value for data used to generate the first data, a data processing function used to generate the first data, and information about the first data into a hash function.

11. The device of claim 10, wherein, when the first data is raw data obtained from a data source, the first hash value is obtained by inputting the first data and the information about the first data into the hash function, and
when the first data is not the raw data, the first hash value is obtained by inputting the first data, the hash value for data used to generate the first data, the data processing function used to generate the first data, and the information about the first data into the hash function.

12. The device of claim 7, wherein a history of the second data is verified by determining whether a hash value generated based on the second data and the second hash value are the same.

13. A system of managing a data history, the system comprising:
a blockchain network; and
a device configured to manage a data history, the device comprising:
a memory configured to store instructions; and
a processor electrically connected to the memory and configured to execute the instructions,
wherein, when the instructions are executed by the processor, the processor is configured to:
generate second data based on first data;
calculate a second hash value for the second data based on the second data and a first hash value for the first data; and
store the second hash value on a blockchain network to verify the second data,
wherein a history of the first data is verified using the first hash value stored on the blockchain network, and
wherein the calculating of the second hash value comprises:
calculating the second hash value by inputting the first hash value, a data processing function, the second data, and information about the second data into a hash function,
wherein the data processing function is used to generate the second data from the first data.

* * * * *